Aug. 27, 1968  C. B. RICHEY ET AL  3,398,799

SUBSOILER HAVING ADJUSTABLE WEAR SHIN

Filed Feb. 15, 1966

INVENTOR.
CLARENCE B. RICHEY &
RONALD E. RASMUSSEN
BY Tweedale & Gerhardt
ATTORNEYS.

United States Patent Office 3,398,799
Patented Aug. 27, 1968

3,398,799
SUBSOILER HAVING ADJUSTABLE WEAR SHIN
Clarence B. Richey, Fresno, and Ronald E. Rasmussen, Sanger, Calif., assignors to Massey-Ferguson Inc., Detroit, Mich.
Filed Feb. 15, 1966, Ser. No. 527,615
5 Claims. (Cl. 172—719)

ABSTRACT OF THE DISCLOSURE

A subsoiler having a wear shin of circular cross section with noncircular end portions seated in complementary sockets at the upper and lower ends of the subsoiler shank to permit the shin to be rotated in steps about its own axis to alternately present a plurality of wear surfaces ahead of the leading edge of the shank. The shin can be selectively inverted with respect to the shank to provide additional wear surfaces.

---

This invention relates generally to earthworking tools and is particularly concerned with increasing the life of subsoilers and or replaceable wear resistant elements for subsoilers and similar tools.

The leading edge and sides of subsoiler shanks are subjected to a high degree of wear. Consequently it is conventional to provide replaceable shins of wear resistant material to protect the leading edge of the subsoiler shank.

In accordance with the present invention, the useful life of the shank is increased by providing a wear shin of circular cross section having noncircular end portions seated in complementary sockets at the upper and lower ends of the shank just permitting the shin to be rotated in steps about its own axis to alternately present a plurality of wear surfaces ahead of the leading edge of the shank. Moreover, the shin can be inverted with respect to the shank to provide additional wear surfaces. Preferably the shin is of greater diameter than the thickness of the shank, and the sockets for receiving the ends of the shin are defined by the space between support plates at the ends of the shank. The round shin provides streamlining of the shank and does not collect roots. With square end portions on the shin, up to eight wear surfaces can be alternately used.

Other objects, advantages and features of the invention will become apparent from the following description taken in connection with the accompanying drawings in which.

Figure 1:
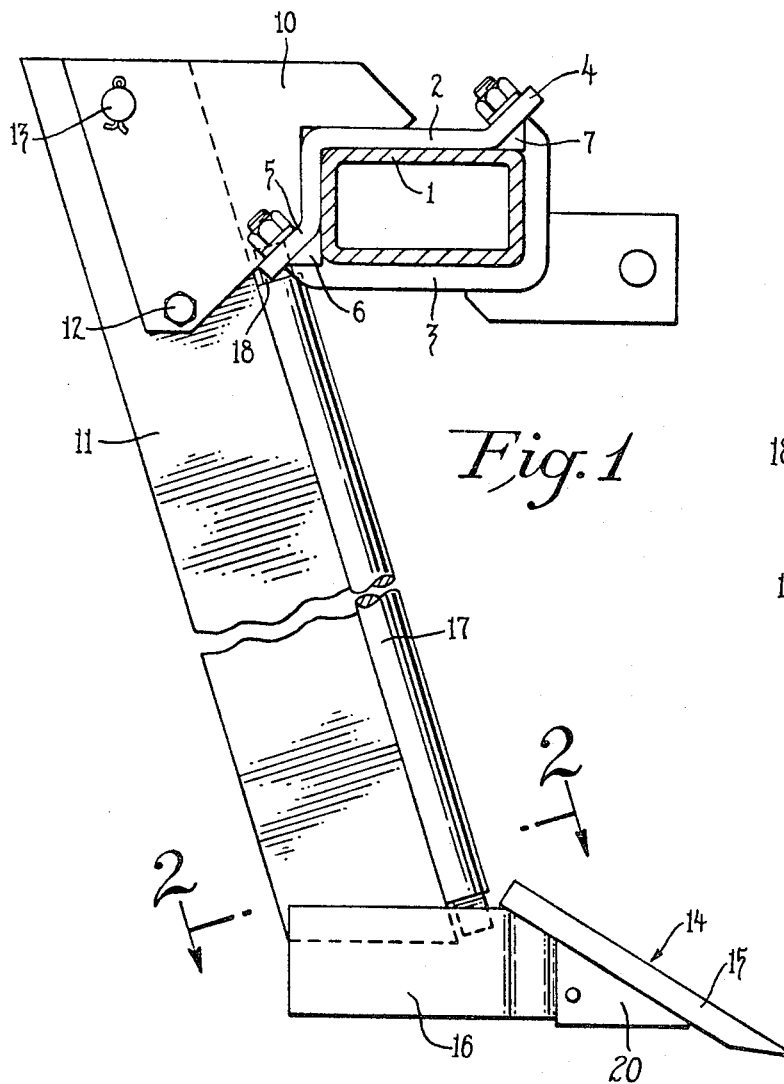
FIG. 1 is an elevational view of a subsoiler assembly with a wear resistant shin embodying the invention.
Figure 3:
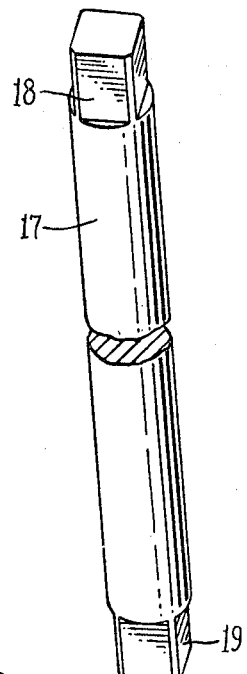
FIG. 3 is a perspective view of the shin.

In the drawings, reference numeral 1 designates a beam or implement frame member to which are secured a clamp plate 2 and a pair of complementary U-bolts 3. Clamp plate 2 has oppositely extending inclined lips or flanges 4 and 5 having support wedges 6 and 7 welded to their lower sides. The support wedges 6 and 7 allow adequate clamping tension by U-bolts 3 across the corners without bending down the edges of the clamp plates or deflecting the sides of the hollow beam 1.

Secured to clamp plate 2 is a pair of support plates 10 (only one of which is visible) which are attached to opposite sides of a subsoiler 11 by pins or bolts 12 and 13. Mounted on the lower depending end of shank 11 is a subsoiler point 14 including a tooth 15 in the form of an inclined plate which is mounted on side plates 16 by means of socket 20. Plates 16 are secured to opposite sides of the lower end of shank 11 by welding or other conventional means.

Figure 2:
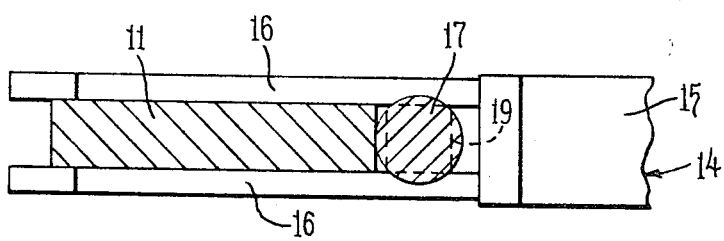
FIG. 2 is a sectional view taken on line 2—2 of FIG. 1.

Extending along the leading edge of shank 11 is a wear shin 17 of circular cross section having noncircular end portions 18 and 19. The noncircular end portions 18 and 19 are received in sockets formed by the space between plates 10 and 16, respectively, and the plate surfaces engage the flat surfaces of the noncircular end portions to prevent rotation of the wear shin about its longitudinal axis. Preferably, the diameter of shin 17 is greater than the thickness of shank 11 as shown in FIG. 2 to prevent wear on the sides of the shank.

The noncircular end portions 18 and 19 permit the shin 17 to be rotated in steps about its longitudinal axis to present alternate wear surfaces ahead of the leading edge of the shank 11. Moreover, by inverting the shin 17 relative to the shank, additional wear surfaces are provided. In the illustrated embodiment the end portions 18 and 19 are of square cross section permitting the shin 17 to be rotated between four positions about its longitudinal axis, and when inverted relative to the shank 11, four additional positions are available.

While a specific example of the invention has been illustrated and described, it will be apparent to those skilled in the art that various equivalent constructions may be provided without departing from the scope and spirit of the invention.

We claim:
1. A subsoiler assembly including a support member, a shank mounted on the support member and depending therefrom, a subsoiler tool secured to the lower end of the shank and projecting forwardly of the leading edge thereof, a wear resistant shin of substantially circular cross section extending along the leading edge of the shank, and means securing the shin adjacent the leading edge of the shank such that the shin may be selectively rotated about its longitudinal axis and for securing the shin in any selected one of a plurality of positions to present a plurality of alternate wear surfaces.

2. A subsoiler assembly as claimed in claim 1 wherein said securing means is releasable and the shin is selectively invertible with respect to the shank.

3. A subsoiler assembly as claimed in claim 2 wherein the shin has a greater diameter than the thickness of the shank to protect the sides of the shank.

4. A subsoiler assembly as claimed in claim 3 wherein said shin is formed with noncircular end portions and said securing means comprises sockets formed in said subsoiler tool and support member complementary to the noncircular end portions of the shin.

5. A subsoiler assembly as claimed in claim 4 wherein the end portions of the shin are of square cross section such that the shin is selectively rotatable relative to the shank in 90 degree steps about its longitudinal axis.

References Cited
UNITED STATES PATENTS

| | | | |
|---|---|---|---|
| 2,053,504 | 9/1936 | Van Sickle | 172—699 |
| 2,466,555 | 4/1949 | Paine et al. | 56—314 |
| 3,207,232 | 9/1965 | Bechman | 172—699 |

ABRAHAM G. STONE, *Primary Examiner.*
S. C. PELLEGRINO, *Assistant Examiner.*